United States Patent
Chu et al.

(10) Patent No.: US 9,826,434 B2
(45) Date of Patent: Nov. 21, 2017

(54) CHANNEL BANDWIDTH INDICATION AND TXOP PROTECTION

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 653 days.

(21) Appl. No.: 13/710,321

(22) Filed: Dec. 10, 2012

(65) Prior Publication Data

US 2013/0155953 A1 Jun. 20, 2013

Related U.S. Application Data (60) Provisional application No. 61/576,945, filed on Dec. 16, 2011.

(51) Int. Cl.
*H04W 28/20* (2009.01)
*H04W 28/22* (2009.01)

(52) U.S. Cl.
CPC .................. *H04W 28/20* (2013.01)

(58) Field of Classification Search
CPC ......... H04W 72/0446; H04W 72/0406; H04W 88/02; H04W 28/20; H04W 72/04; H04W 74/0816; H04W 28/044; H04W 84/06; H04W 84/12; H04L 5/0073; H04B 7/18528; H04B 7/18571; H04B 7/18576
See application file for complete search history.

(56) References Cited

U.S. PATENT DOCUMENTS

| | | | |
|---|---|---|---|
| 2001/0040880 A1* | 11/2001 | Chen | H04W 52/265 370/337 |
| 2008/0192644 A1* | 8/2008 | Utsunomiya et al. | 370/252 |
| 2010/0085950 A1* | 4/2010 | Sekiya | H04W 72/1215 370/338 |
| 2010/0260092 A1* | 10/2010 | Nagaraja | 370/315 |
| 2010/0284393 A1* | 11/2010 | Abraham et al. | 370/343 |
| 2011/0103280 A1* | 5/2011 | Liu et al. | 370/311 |

(Continued)

OTHER PUBLICATIONS

Vocal Technologies, Ltd. Home page, "802.11a White Paper," 2002, pp. 1-17.

*Primary Examiner* — Andrew Lai
*Assistant Examiner* — M Mostazir Rahman
(74) *Attorney, Agent, or Firm* — Slater Matsil, LLP (57) ABSTRACT

Methods and systems are disclosed for the operation of wireless communication networks, in which communication channels can have possibly overlapping bandwidths of different sizes, including sensor networks operating by the IEEE 802.11ah standard. A first method of signaling to negotiate the channel bandwidth conveys the needed information in the SIG field of the PPDUs of duplicate RTS/CTS frames, and uses the SIG field of PPDUs of duplicated data, control and management frames to perform transmit opportunity protection. A second method of signaling to negotiate the channel bandwidth conveys the needed information in the scrambling sequence field of PPDUs of duplicate RTS, and uses the scrambling sequence field of PPDUs of duplicated data, control and management frames to perform transmit opportunity protection.

22 Claims, 5 Drawing Sheets

(56) References Cited

U.S. PATENT DOCUMENTS

| | | | |
|---|---|---|---|
| 2012/0057534 A1* | 3/2012 | Park | 370/329 |
| 2012/0082147 A1* | 4/2012 | Liu et al. | 370/338 |
| 2012/0177017 A1* | 7/2012 | Gong et al. | 370/338 |
| 2012/0250523 A1* | 10/2012 | Miki | H04L 1/1861 370/242 |
| 2012/0327870 A1* | 12/2012 | Grandhi et al. | 370/329 |
| 2013/0176980 A1* | 7/2013 | Kneckt | H04W 28/26 370/329 |
| 2013/0294394 A1* | 11/2013 | Kneckt | H04W 74/0816 370/329 |
| 2014/0269405 A1* | 9/2014 | Liu et al. | 370/253 |

* cited by examiner

CHANNEL BANDWIDTH INDICATION AND TXOP PROTECTION

CROSS-REFERENCE TO RELATED APPLICATION

This application claims the benefit of U.S. Provisional Application Ser. No. 61/576,945, filed Dec. 16, 2011. The disclosure of the foregoing United States patent application is specifically incorporated herein by this reference.

BACKGROUND OF THE INVENTION

1. Field of the Invention

The present invention relates, in general, to methods and systems of wireless networks for determining and negotiating channel bandwidths to be used within the network. More particularly, the invention relates to, but is not limited to, wireless networks operating in the Sub 1 GHz band, especially networks using the emerging IEEE standard 802.11 ah.

2. Relevant Background.

In the well-established IEEE 802.11a/b/g/n standards for wireless local area networks, an access point (AP) is a radio communication device that communicates with several other devices, called stations (STAs), such as computers, cellphones, printers, etc. The AP typically acts as a hub through which messages between stations are relayed, and is often connected to larger networks, such as the internet, and provides the stations with access to the larger network. The standards establish procedures for how the APs and STAs are to transmit information, and how they are to coordinate the use of the radio transmission medium. Coordination of when a device can use the radio transmission channel is known as medium access control (MAC).

The 802.11a/b/g/n standards also specify fixed channel bandwidths (20 MHz or 40 MHz with /n). They further specify the procedures for MAC, by which the use of a channel is coordinated within a basic service set (BSS) comprising a central AP and a set of stations STAs, e.g., laptops, cellphones, etc. They also specify the main frequency bands in which the channels are located (2.4 GHz (/b/g/n), 3.7 GHz (/a) and 5 GHz (/a/n)).

Figure 1:
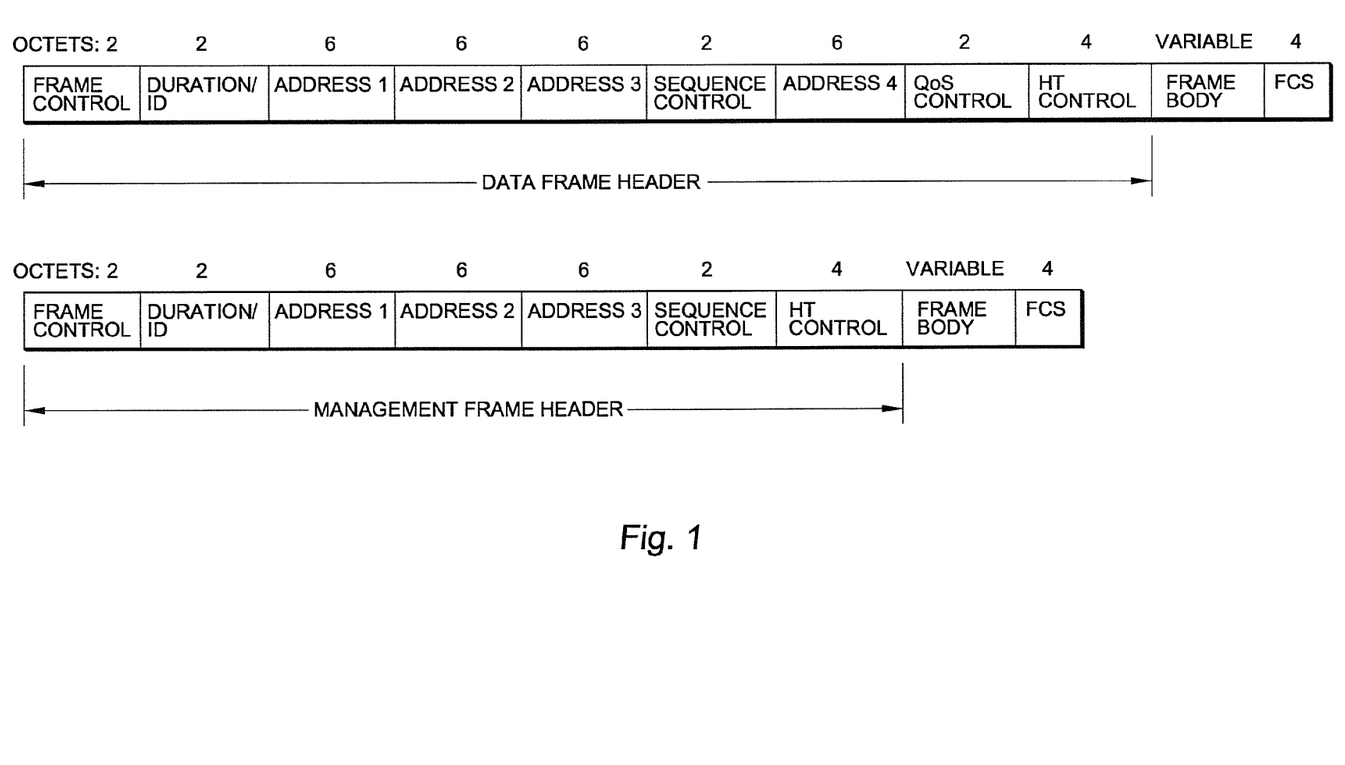
FIG. 1 shows a known standard arrangement of fields in a frame according to the 802.11a/b/g/n standards.

A fundamental feature of such networks is that an entire message is digitized and the digital data is organized into separate blocks and transmitted in frames. The frames include separate header fields carrying further information necessary for synchronization, network coordination, and reformulation of the message data. FIG. 1 shows two examples of the header field structure used in data and management frames in the 802.11 standards. The detailed terminology of frames and frame-based communications are specified in the standard IEEE 802.11-2012. The standard is cited as a reference for terminology and background information about frame transmission, and does not imply that the communication networks of this disclosure necessarily use the physical wireless transmission methods described therein.

Two recent, emerging amendments to the IEEE 802.11 standard (/ac and /ah) specify new frequency bands for transmission: respectively 5 GHz and Sub 1 GHz (902 MHz to 928 MHz). In the case of 802.11ac, the goal is to provide very high data rates (more than 500 Mbps), whereas for 802.11ah the goal is to provide long range (up to 1 km) for networks (e.g., smart grids or other sensor networks) with many (e.g., 6000) stations needing only low data rates (e.g., 100 kbps), on an intermittent basis. The 802.11 ah standard takes advantage of not needing to be backwards compatible with other standards, and so can optimize how the transmitted data is organized into frames, and optimize the content and organization of the header fields of the MAC and physical layer frames. The 802.11ac standard needs to be backwards compatible with the 802.11a/n standards.

Figure 3:
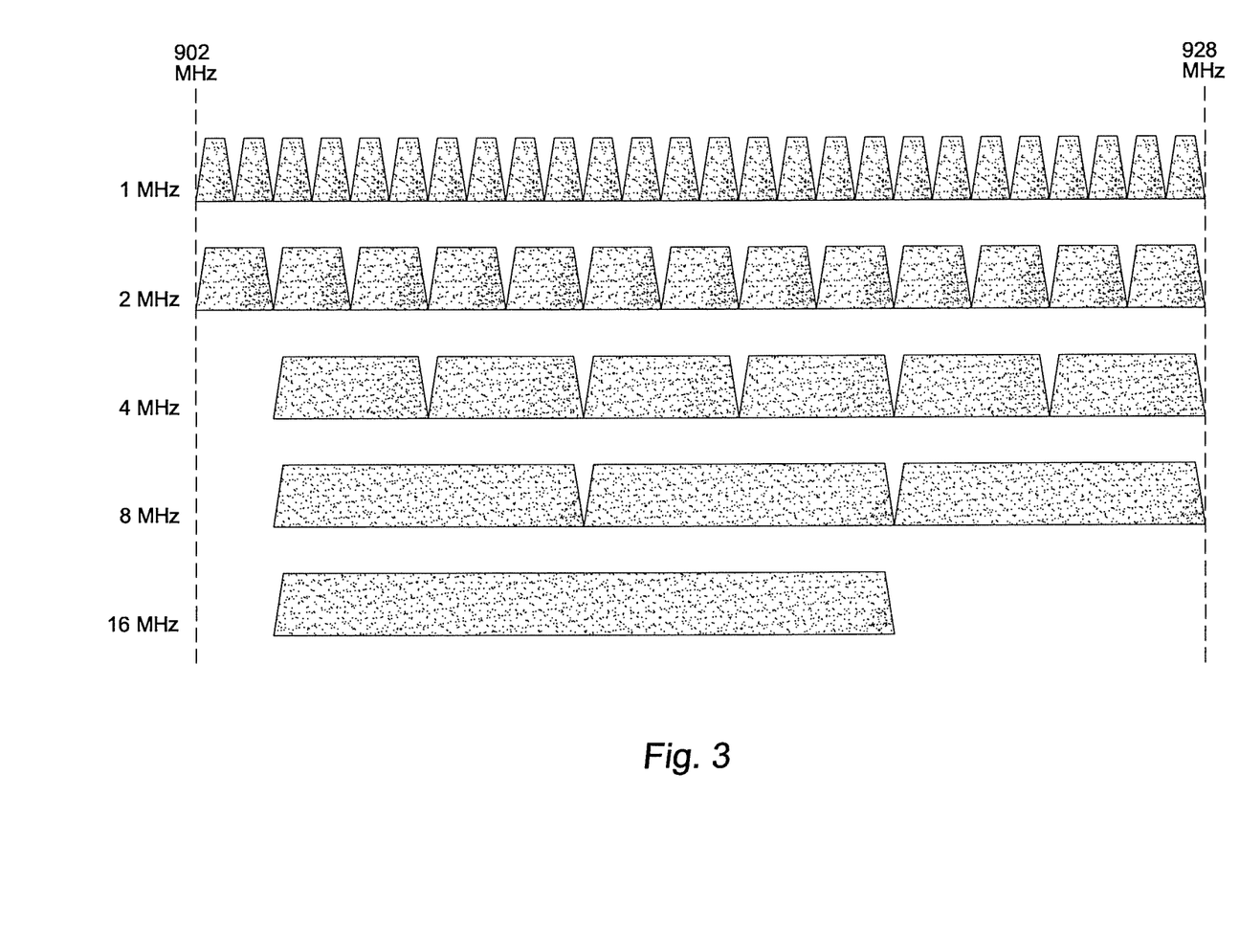
FIG. 3 shows how fundamental channel widths are arranged ("channelization") into transmission channels of progressively higher bandwidths, according to the 802.11 ah standard, in the United States.

Both standards specify that an entire allowed frequency range be subdivided into a fixed number of relatively narrow bandwidth channels of equal bandwidth, called fundamental channels, and that the devices can transmit using channels of different bandwidths, herein called transmission channels, built from multiple fundamental channels. When the duplicate frames are transmitted in transmission channels, each duplicate frame is transmitted in a fundamental channel. In the case of 802.11ac, the possible channel bandwidths are 20/40/80/160/80+80 MHz. In the case of 802.11ah, the channel bandwidths are 1/2/4/8/16 MHz. FIG. 3 shows the 802.11 ah channelization for the United States. The advantage of channels with wider bandwidths is greater data transmission rates. An advantage of the Sub-1 GHz frequency range is that it allows greater range, and suffers less interference from intervening objects.

However, having unfixed channel bandwidths available can create challenges for coordinating channel access. A first challenge is for the devices (APs or STAs) to have conflict-free transmission opportunities (TXOPs), in which only one device transmits at a time, and the various devices know the bandwidth and channels to be used by a transmitting device. In the 802.11ac standard, bandwidth information can be carried by PPDUs; duplicate frames transmitted in multiple fundamental channels are used for TXOP bandwidth indication and negotiation and for TXOP protection. The methods of 802.11ac need to be compatible with legacy 802.11a/n stations in the 5 GHz band. The fundamental channel bandwidth is 20 MHz since legacy 802.11a devices only understand 20 MHz PPDUs. Since 802.11a PHY SIG does not include bandwidth indication, 802.11 ac needs to put the bandwidth information in another place in the PHY header.

The difference between the 802.11ah standard and the 802.11ac standard is that the former does not require backward compatibility with older standards, and so new methods for TXOP bandwidth indication and negotiation methods can be deployed. The 802.11 ah standards can put bandwidth information in the PHY SIG subfield for bandwidth indication and bandwidth negotiation. It is not necessary that 1 MHz is the fundamental channel bandwidth. Another option is that 2 MHz is the fundamental channel bandwidth once 1 MHz devices can decode 2 MHz frames.

Glossary and Acronyms

As a convenient reference in describing the invention herein, the following glossary of terms is provided. Because of the introductory and summary nature of this glossary, these terms must also be interpreted more precisely by the context of the Detailed Description in which they are discussed.

A-MPDU Aggregated MAC Protocol Data Unit
AP Access Point
BSS Basic Service Set
BLK_ACK Block Acknowledgement Signal
CF Coordination Function
CTS Clear To Send
EDCA Enhanced Distributed Channel Access
HT High Throughput
HT-LTF High Throughput, Long Training Field
HT-SIG High Throughput, Signal Field L-LTF Legacy Long Training Field
L-STF Legacy Short Training Field
LTF Long Training Field
MAC Medium Access Control
MPDU MAC Protocol Data Unit
OBSS Overlapping Basic Service Set
PLCP Physical Layer Convergence Procedure
PPDU PLCP Protocol Data Unit
PSDU PLCP Service Data Unit
RTS Request To Send
SIG Signal [a field within PPDU]
STF Short Training Field
TXOP Transmission Opportunity
VHT Very High Throughput

SUMMARY OF THE INVENTION

The present invention discloses methods and systems for communicating or negotiating transmission channel bandwidths in wireless communication networks, and for protecting transmission opportunities of devices in those networks. In a first embodiment, the method comprises using the signal SIG field of PPDUs of duplicated RTS/CTS frames for TXOP channel width negotiation. In another embodiment, the SIG field of PPDUs of duplicated data frames, control frames, and management frames is used to perform TXOP protection.

In other embodiments, in systems using 1 MHz fundamental channels, 1 MHz duplicate frames are used for channel bandwidth negotiation and TXOP protection in a BSS that uses operating channels greater than 1 MHz. This can decrease power consumption of stations using 1 MHz channels. In another embodiment, 2 MHz channels are the fundament channels. In such an embodiment, all stations that use 1 MHz channels can understand 2 MHz and 1 MHz transmissions. When a STA in a BSS uses a wider than 2 MHz operating channel, 2 MHz duplicated frames are used. Once a 1 MHz STA receives a 2 MHz frame it needs to decode the Duration value in the received frame. Similarly, once a greater than 2 MHz station receives a 1 MHz frame, it needs to decode the Duration value in the received frame so that it does not try to transmit any frame during the time defined by the Duration value.

DETAILED DESCRIPTION OF THE PREFERRED EMBODIMENTS

In the detailed description and claims that follow, the word "a" or "an" preceding an element does not exclude the presence of a plurality of such elements.

In the 802.11 standards, MAC is accomplished by carefully specifying fields of digital data in particular orders, arranged into a single frame. The fields incorporate information on the identity or addresses of the sending and receiving devices. There are three basic types of frames in the 802.11 standards: data, control and management. FIG. 1 shows the fields within standard data and management frames. The fields surrounding the Frame Body are called header fields.

Figure 2:
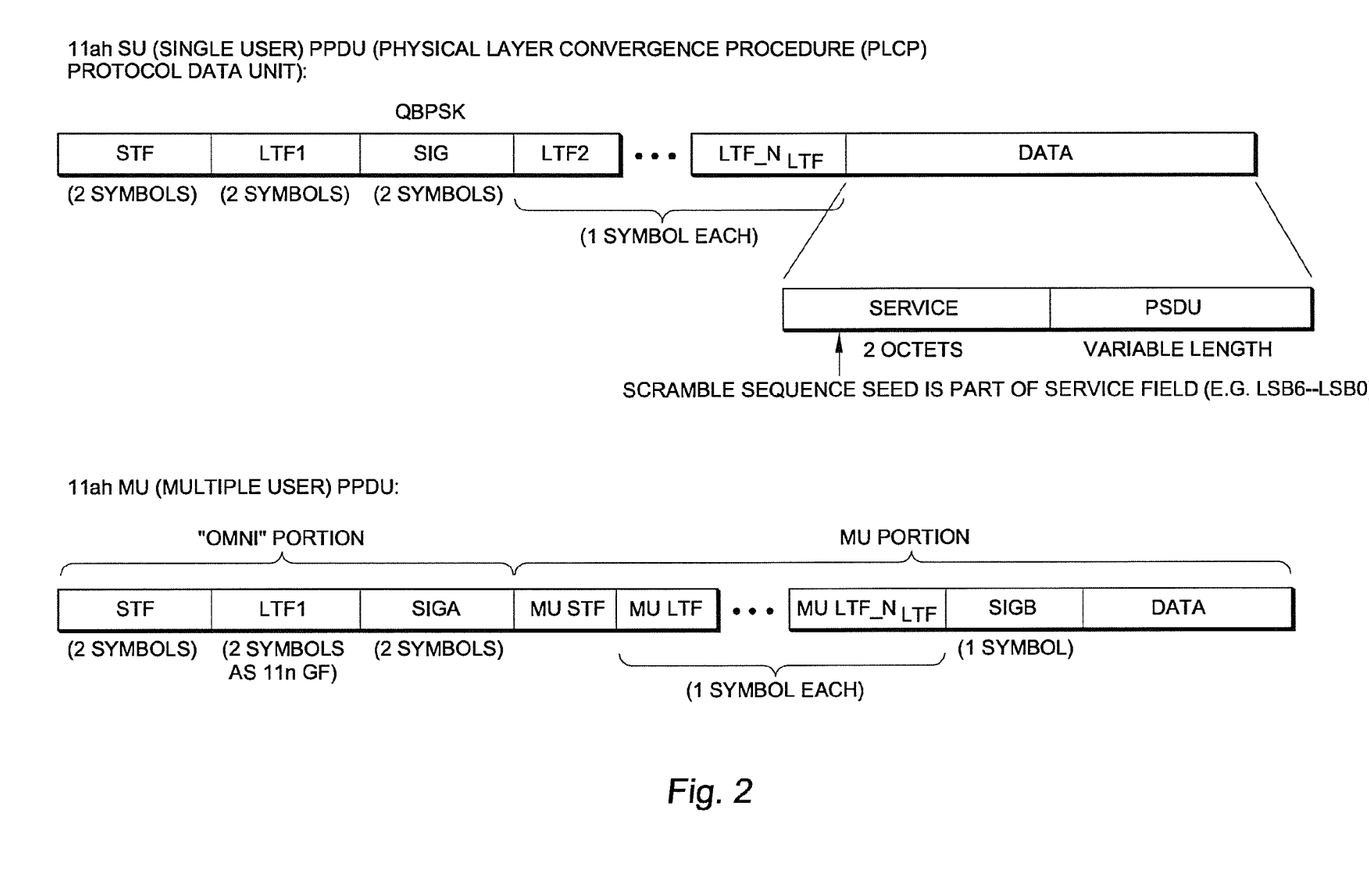
FIG. 2 shows one known form of the physical header fields for PPDUs for the 802.11 ah standard.

In order for the radio transceiving hardware at each device to determine where a MAC frame begins and ends, and to coordinate timing and synchronization procedures, MAC frames themselves are enclosed in further physical layer header fields. The organization of these physical layer header fields depends on the particular type of digital signaling used. The physical header fields typically include preambles, short training fields (STF), and long training fields (LTF), which allow the radio transceivers to synchronize and to estimate the channel conditions (e.g., noise levels). The physical headers also include a signal (SIG) field to transmit PHY layer control information. The combination of the physical layer header fields together with the transmitted MAC frame is termed the Physical Convergence Procedure Protocol Data Unit (PPDU). FIG. 2 illustrates two examples for the arrangement of fields within a PPDU, for use with the 802.11ah standard.

Next, within the DATA part of a PPDU is a service field, which comprises a number of bits used as a seed of a scrambling sequence. The scrambling seed is used at the transmitter device to scramble (rearrange) the contents of the rest of the PPDU, and at the receiver for descrambling.

The 802.11 ah standard supports multiple use cases, such as smart grid applications, sensor networks, and network offloading. Such cases have different requirements: strict power saving requirements for sensor applications or higher bandwidth requirements for network offloading. The 802.11ah standard modifies the basic structures of 802.11a/b/g/n standards to create a variant optimized for networks containing hundreds, perhaps thousands, of stations which only need to transmit and receive comparatively limited amounts of data, for limited amounts of time. An example of such a network could be a smart grid wireless sensor network. One of the modifications is the organization of the physical layer header fields. An exemplary organization of the physical headers is shown in FIG. 2. The entire MAC frames, such as those shown in FIG. 1, are part of the shown DATA fields.

An important modification in the 802.11 ah standard is to allow a device in the communication network to use radio transmission channels of different bandwidths, built from varying numbers of relatively narrow bandwidth building block channels, herein called fundamental channels. Another important modification is to use the frequency band of 902 MHz to 928 MHz. FIG. 3 shows a proposed channelization of this frequency band according to the 802.11 ah standard, for the United States. In the case shown, the fundamental channel width is 1 MHz; and with this channelization the network is denoted a 1/2/4/8/16 MHz network. Some networks, for other regulatory regions, may have fewer available channels and analogously be denoted a 1/2/4/8 MHz network, or a 1/2/4 MHz network. One fundamental channel serves as the primary channel, that is, a common channel of operation of all devices in the communication network's basic service set (BSS). The primary channel is used for the transmission and reception of the beacon and other narrow bandwidth PPDUs.

With four available channel bandwidths (e.g., a 2/4/8/16 MHz network or a 1/2/4/8 MHz network) only 2 bits are needed for a source device to transmit the choice of bandwidth that it desires to use in its subsequent transmission during the current transmission opportunity. For a 1/2/4/8/16 MHz network, 3 bits may be needed. To ensure that the transmission will not interfere with other network devices (herein called alternate devices), and to ensure that its communication can be received, the source device transmits duplicate signals on all of the fundamental channels that comprise the combined channel it desires to use. The duplicated signals contain the bits needed to indicate the bandwidth of the source device's desired channel. Once a single signal is received, the received device can determine the bandwidth that source device uses for the duplicated signals.

In some embodiments, reception of the duplicated signals by the alternate devices allows them to send reply signals to indicate whether they are able to receive at that bandwidth and are free to do so. Once the replies have been received, the source device can adjust the channel bandwidth, if necessary, of its transmission.

In a regulatory region which allows 1 MHz channels, one issue that arises is the bandwidth of the fundamental channel. In one embodiment of the invention, when 1 MHz is the fundamental channel bandwidth, the system uses a 1 MHz duplicate mode. Under this mode, some stations may only be able to transmit and receive in 1 MHz bandwidths. Stations that can transmit with greater than 1 MHz bandwidths then transmit duplicate 1 MHz frames so the 1 MHz stations can decode the Duration field of the duplicate 1 MHz frames. This will simplify the 1 MHz operation mode since in this mode a station will not try to receive a 2 MHz frame.

In another embodiment, 2 MHz is the fundamental channel's bandwidth, and the system uses a 2 MHz duplicate mode. Under this mode, all stations can receive both 1 MHz and 2 MHz bandwidth transmissions. A 1 MHz station (one that can only transmit signals in a 1 MHz bandwidth channel) can transmit 1 MHz frames to another 1 MHz station. However, a 1 MHz station will still be able to receive and decode 2 MHz frames from a station that transmits at greater than 1 MHz bandwidth. These greater than 1 MHz bandwidth stations will transmit duplicate 2 MHz frames so that 1 MHz stations can decode the Duration field of the duplicate 2 MHz frames. The greater than 1 MHz stations will also be able to receive and decode 1 MHz frames from 1 MHz stations. A station can use the special PHY format of a 1 MHz PPDU to identify the 1 MHz transmission. In a BSS having transmission channels greater than 1 MHz, and using 2 MHz duplicate mode, two stations may use 1 MHz bandwidth channels to communicate with each other.

For 1/2/4/8/16 MHz channelization under 2 MHz duplicate mode, only 2 bits are needed for a source device to transmit the choice of bandwidth that it desires to use in its transmission; in one embodiment, 00, 01, 10 and 11 indicate 2 MHz, 4 MHz, 8 MHz and 16 MHz channels, respectively.

Once the communication system's channelization is known, the next issue is to determine a method for transmitting the bits used for channel bandwidth indication. A known method is to use the bits in the SERVICE field in PHY header (see FIG. 2) to carry the bandwidth indication. The remaining bits in SERVICE field are used for scrambling. In this method, to differentiate a SERVICE field carrying only bits for scrambling from a SERVICE field carrying bits for both bandwidth indication and scrambling, the Unicast/Multicast bit in address field TA in the MAC header is used. This method has several issues. The changed TA MAC address will influence the parts of the MAC protocol that are based on the TA, e.g., NAV setting and the responding frame creation. The scrambling algorithm is also influenced.

Instead, in one embodiment of the invention herein, another method is to use the bits in PHY SIG to carry the bandwidth indication. This method has no influence on the other parts of the MAC protocol, e.g., the responding creation or the NAV setting. The scrambling algorithm is not influenced. In one embodiment of the invention, another bit in the PHY SIG field is used for the TXOP bandwidth negotiation by combining with the bandwidth indication.

In one embodiment, the devices in the communication network use Request-To-Send (RTS) and Clear-To-Send (CTS) signals, contained in PPDUs, to coordinate an upcoming transmission. In this embodiment, the PPDUs contain a signal field (SIG) which is used by the source device to transmit the bits needed to indicate the bandwidth desired for the transmission. The alternate devices use the SIG field of the PPDU of the CTS signal to indicate the channel bandwidth they accept. This is accomplished by using 2 bits in the case that the network uses at most four channel bandwidths or five channel bandwidths under 2 MHz duplicate mode, or 3 bits if the network uses five channel bandwidths under 1 MHz duplicate mode.

There are two known methods by which a source device and a destination device decide the TXOP bandwidth: bandwidth static method and bandwidth dynamic method. In the bandwidth static method, the source station decides the TXOP bandwidth and the destination will not send the responding frame if the destination cannot support the bandwidth (e.g., busy medium detection) indicated by the source. In the bandwidth dynamic method, the source station and the destination station negotiate the TXOP bandwidth. An additional bit is needed to indicate whether the station that initiates the transmission is able to do bandwidth negotiation. When this bit is set to 1, the destination station can select a transmission bandwidth for the source station that is narrower than the source station selected. When this bit is set to 0, the source decides the transmission bandwidth and the destination follows the bandwidth selected by the source station. If the destination station cannot follow the bandwidth selected by the source station, the destination station will not transmit the responding frame, which means an unsuccessful transmission.

There are various methods for transmitting the bit needed to implement bandwidth dynamic/static indications. One method is to follow 802.11ac's method of using the bits in SERVICE field in PHY header to carry the bandwidth dynamic/static indication. The remaining bits in SERVICE field are used for scrambling. To differentiate between the SERVICE field only for scrambling from the SERVICE field for bandwidth dynamic/static indication and scrambling, the Unicast/Multicast bit in address field TA in MAC header is used. This method has several issues. The changed TA MAC address will influence part of the MAC protocol that is based on TA, e.g., NAV setting or the responding frame creation. The scrambling algorithm is also influenced.

One embodiment of the invention is to use the bits in PHY SIG to carry the bandwidth dynamic/static indication. This method has no influence to other parts of the MAC protocol, e.g., the responding creation or NAV setting. The scrambling algorithm is not influenced.

Figure 4:
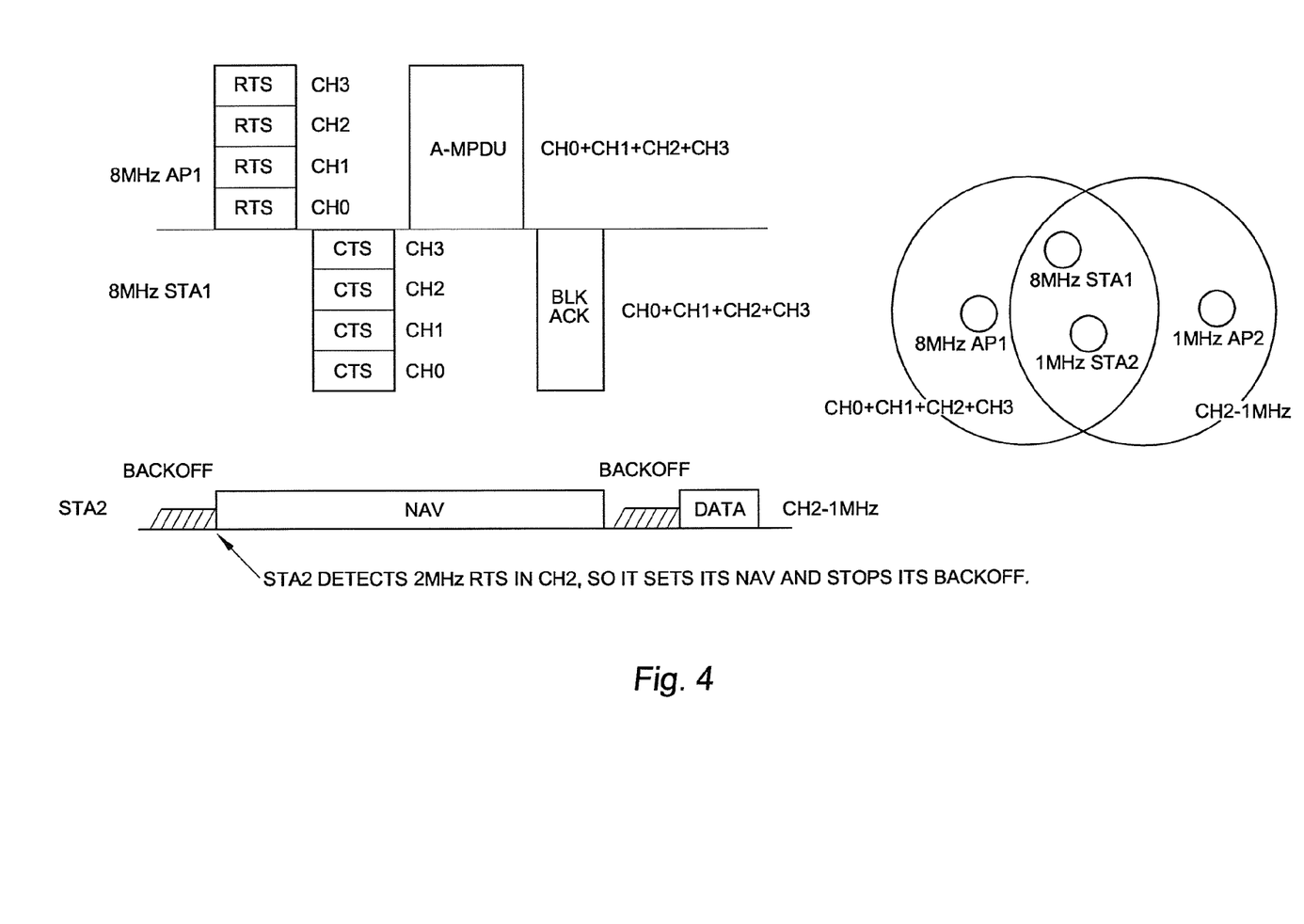
FIG. 4 shows frame duplication across multiple 2 MHz fundamental channels of RTS/CTS signals for TXOP protection, using static mode, according to one embodiment of the present invention.

FIG. 4 shows an example of an embodiment of the bandwidth static method. An AP sends duplicate RTS signals on four fundamental channels, in this example with channel 0 being the primary channel, since the AP detects that all four fundamental channels are idle. In this example, the roles of AP1 and STA1 can be reversed (i.e., STA1 could be the device that initiates the duplicate RTS signals after detecting the idle channels, and AP1 could be the responding device). Duplication of the RTS signals on the four fundamental channels indicates the AP's intent to transmit using the bandwidth and frequencies of those four channels. STA1 responds with CTS signals on all four channels in the case that the STA1 detects that all four intended fundamental channels are idle. In the case that another STA is using one of the channels 0-3, the STA1 does not respond with duplicate CTS signals, and the RTS/CTS exchange fails. Upon receiving the four CTS signals the AP transmits the Aggregated MAC Protocol Data Unit (A-MPDU) in the four fundamental channels. STA1 then transmits a Block Acknowledgement (BLK_ACK) signal. Another embodiment is that a station sends duplicate RTS signals to an AP in static bandwidth mode and the AP responds with duplicate CTS signals after it receives the duplicate RTS signals, or the AP does not respond if it detects a busy channel. Another embodiment is that a first station sends duplicate RTS signals to a second station in static bandwidth mode and the second station responds with duplicate CTS signals after it receives the duplicate RTS signals.

Figure 5:
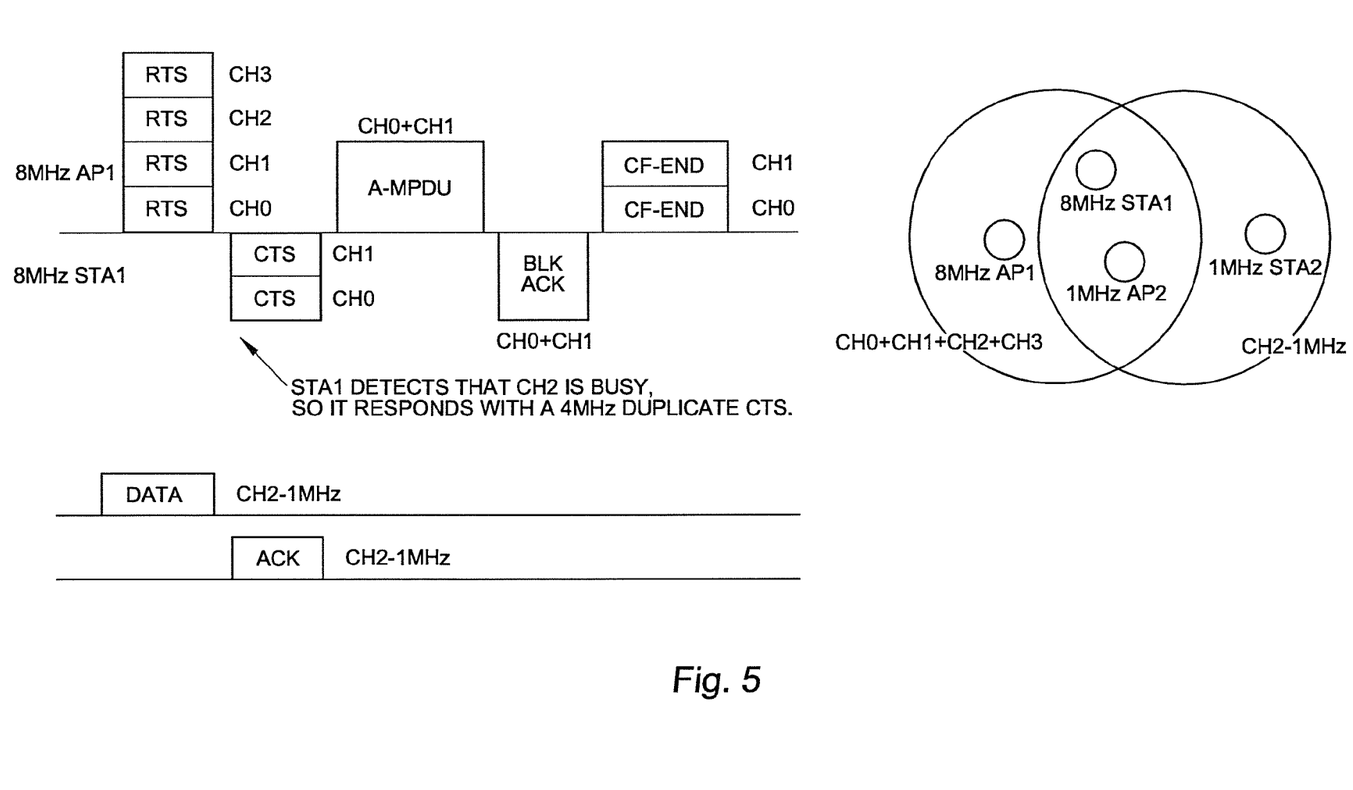
FIG. 5 shows duplication across multiple 2 MHz fundamental channels of RTS/CTS signals for TXOP negotiation, using dynamic mode, according to one embodiment of the present invention.

FIG. 5 shows an example of an embodiment of TXOP bandwidth negotiation. In this method, the TXOP holder and the TXOP responder can negotiate the channel bandwidth of the TXOP. Though for definiteness FIG. 5 shows AP1 initiating the negotiation method, and STA1 responding, the method applies analogously when STA1 is the initiator, and AP1 the responder. As shown, an 8 MHz channel (ch0+ch1+ch2+ch3, each a 2 MHz fundamental channel) is the operating channel of AP1. AP1 sends duplicate RTS signals on all four of its operating channels. STA1, however, detects that a 1 MHz subchannel of ch2 is in use by STA2 (in the BSS of AP2, which overlaps the BSS of AP1). So STA1 responds with CTS signals only on channels ch0 and ch1 (4 MHz total bandwidth). Upon reception of the reduced number of CTS signals, AP1 reduces the bandwidth and channels that it uses to send the A-MPDU.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of transmitting and receiving information regarding transmission channel bandwidth negotiation and protection of transmit opportunities (TXOPs) in a communication network, the method comprising:
operating the communication network over a frequency range comprising a plurality of fundamental channels by
using one fundamental channel to define a transmission channel having a different frequency band overlapping with other transmission channels, the communication network organizing transmissions in a plurality of frames comprising a physical protocol data unit (PPDU), and
transmitting the information regarding transmission channel bandwidth negotiation and protection of TXOPs within a signal field of the PPDU of duplicated data frames within the communication network, the signal field comprising a plurality of bits indicating a desired one fundamental channel defining a desired transmission channel, wherein a source device requests the desired transmission channel to use for a respective transmission, wherein the information regarding transmission channel bandwidth negotiation and protection within the signal field of the PPDU comprises 1 bit to indicate Static/Dynamic mode.

2. The method of claim 1 wherein the one fundamental channel comprises a 2 MHz channel; and wherein a 2 MHz duplicate mode identifies transmission channels that are 2 MHz, 4 MHz, 8 MHz and 16 MHz.

3. The method of claim 2 wherein a 2 MHz PPDU is transmitted in two 1 MHz channels and 1 MHz station decodes the 2 MHz PPDU.

4. The method of claim 2 wherein a 2 MHz station decodes a 1 MHz PPDU in one of two 1 MHz channels covered by a 2 MHz fundamental channel.

5. The method of claim 1 wherein a 1 MHz duplicate mode identifies the transmission channels that are 1 MHz, 2 MHz, 4 MHz, 8 MHz and 16 MHz.

6. The method of claim 1 wherein a Request-To-Send (RTS) signal carries Static/Dynamic mode indication.

7. The method of claim 1 wherein transmission channel bandwidth negotiation and protection of TXOPs in Static mode comprises:
determining, by the source device, a desired channel bandwidth;
sending a responding frame, by a destination device, when the destination device can support the desired channel bandwidth; and
avoiding sending the responding frame, by a destination device, when the destination device cannot support the desired channel bandwidth.

8. The method of claim 1 wherein transmission channel bandwidth negotiation and protection of TXOPs in Dynamic mode comprises:
determining, by the source device, a desired channel bandwidth; and
sending a responding frame, by a destination device, when the destination device cannot support the desired channel bandwidth, wherein the responding frame comprises a second channel bandwidth, the second channel bandwidth being narrower than the desired channel bandwidth.

9. The method of claim 1 wherein the communication network implements IEEE 802.11ah standard.

10. A communication network comprising:
an access point; and
a plurality of wireless devices configured to communicate with said access point, said access point configured to
operate over a frequency range comprising a plurality of fundamental channels by using one fundamental channel to define a transmission channel having a different frequency band overlapping with other transmission channels, and
organize transmissions in a plurality of frames comprising a physical protocol data unit (PPDU), wherein a wireless device from said plurality of wireless devices configured to transmit information regarding transmission channel bandwidth negotiation and protection of transmit opportunities (TX-OPs) within a signal field of the PPDU of duplicated data frames within the communication network, the signal field comprising a plurality of bits indicating a desired one fundamental channel defining a desired transmission channel which said wireless device requests to use for a respective transmission, wherein the information regarding transmission channel bandwidth negotiation and protection within the signal field of the PPDU comprises 1 bit to indicate Static/Dynamic mode.

11. The communication network of claim 10 wherein the one fundamental channel comprises a 2 MHz channel; and wherein a 2 MHz duplicate mode identifies transmission channels that are 2 MHz, 4 MHz, 8 MHz and 16 MHZ.

12. The communication network of claim 11 wherein a 2 MHz PPDU is transmitted in two 1 MHz channels and 1 MHz station decodes the 2 MHz PPDU.

13. The communication network of claim 11 wherein a 2 MHz station decodes a 1 MHz PPDU in one of two 1 MHz channels covered by a 2 MHz fundamental channel.

14. The communication network of claim 10 wherein a 1 MHz duplicate mode identifies the transmission channels that are 1 MHz, 2 MHz, 4 MHz, 8 MHz and 16 MHZ.

15. The communication network of claim 10 wherein a Request-To-Send (RTS) signal carries Static/Dynamic mode indication.

16. The communication network of claim 10 wherein,
in static mode,
a wireless device of the plurality of wireless devices is configured to determine a desired channel bandwidth, and
send a Request-To-Send (RTS) signal to indicate the desired channel bandwidth, and
the access point is configured to
send a first response frame when the access point can support the desired channel bandwidth, and
avoid sending the first response frame when the access point cannot support the desired channel bandwidth; and
in dynamic mode,
the wireless device of the plurality of wireless devices is configured to determine a desired channel bandwidth, and send an RTS signal to indicate the desired channel bandwidth, and
the access point is configured to send a second response frame when the access point cannot support the desired channel bandwidth, wherein the second response frame comprises a second channel bandwidth, the second channel bandwidth being narrower than the desired channel bandwidth.

17. A communication network comprising:
an access point; and
a plurality of wireless devices configured to communicate with said access point, said access point configured to
operate over a frequency range comprising a plurality of fundamental channels by at least using at least one fundamental channel to define a transmission channel having a different frequency band overlapping with other transmission channels, and
organize transmissions in a plurality of frames comprising a physical protocol data unit (PPDU), wherein a wireless device from said plurality of wireless devices configured to
transmit information regarding transmission channel bandwidth negotiation and protection of transmit opportunities (TXOPs) within a signal field of the PPDU of duplicated data frames within the communication network, the signal field comprising a plurality of bits indicating a desired at least one fundamental channel defining a desired transmission channel which said wireless device requests to use for a respective transmission, and
transmit the duplicated data frames with the signal field on each fundamental channel that said wireless device requests to use for the respective transmission, the signal field of the PPDU comprising 1 bit to indicate Static/Dynamic mode.

18. The communication network of claim 17 wherein the at least one fundamental channel comprises a 2 MHz channel; and wherein a 2 MHz duplicate mode identifies transmission channels that are 2 MHz, 4 MHz, 8 MHz and 16 MHz.

19. The communication network of claim 18 wherein a 2 MHz PPDU is transmitted in two 1 MHz channels and 1 MHz station decodes the 2 MHz PPDU.

20. The communication network of claim 18 wherein a 2 MHz station decodes a 1 MHz PPDU in one of two 1 MHz channels covered by a 2 MHz fundamental channel.

21. The communication network of claim 18 wherein a 1 MHz duplicate mode identifies the transmission channels that are 1 MHz, 2 MHz, 4 MHz, 8 MHz and 16 MHz.

22. The communication network of claim 18 wherein a Request-To-Send (RTS) signal carries Static/Dynamic mode indication.

* * * * *